W. O. GOTTWALS.
TIRE MACHINE.
APPLICATION FILED MAR. 20, 1916.

1,248,645.

Patented Dec. 4, 1917.
4 SHEETS—SHEET 1.

Witness
Marshall C. Low

Inventor
William O. Gottwals.
By N. N. Low
Attorney

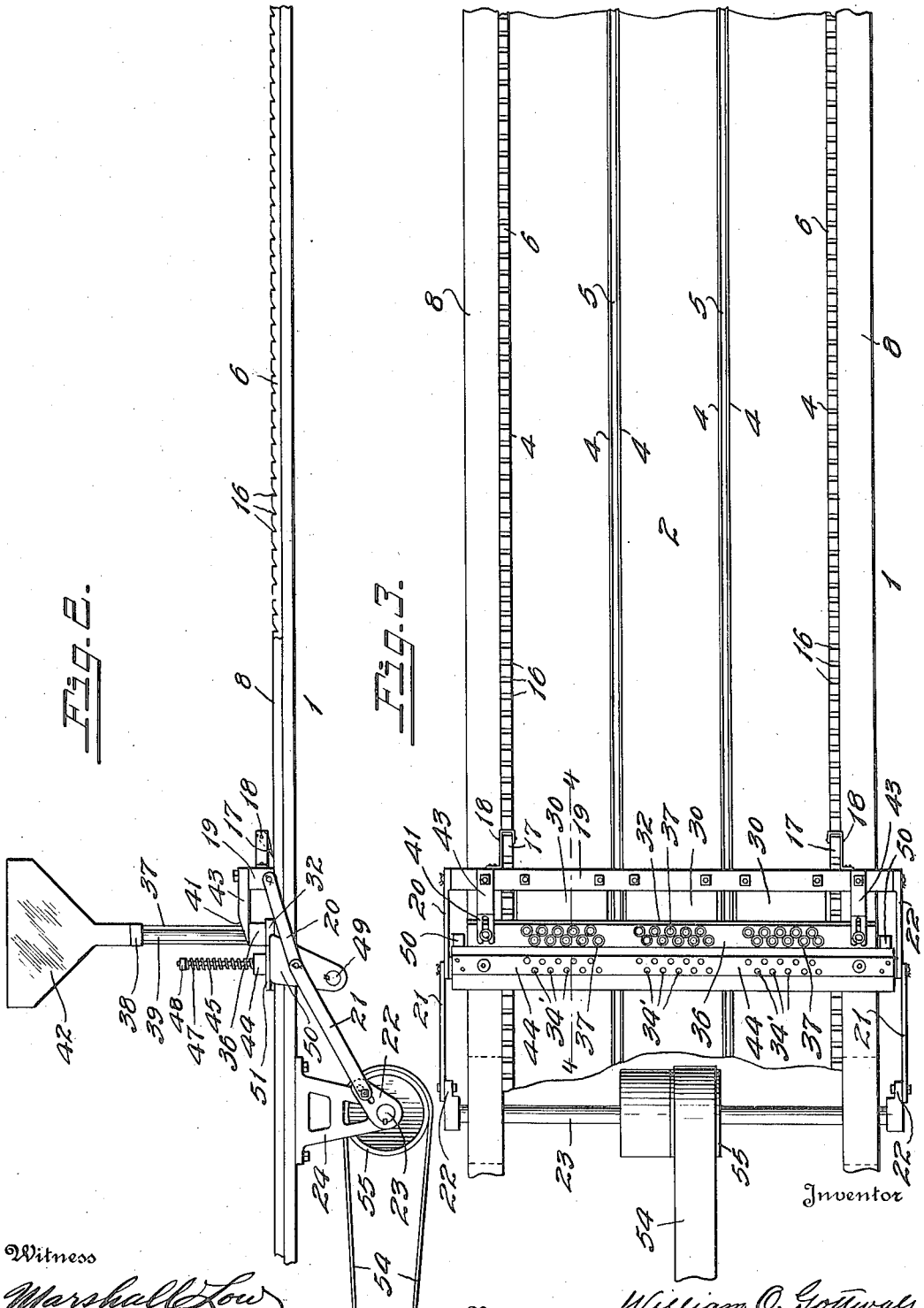

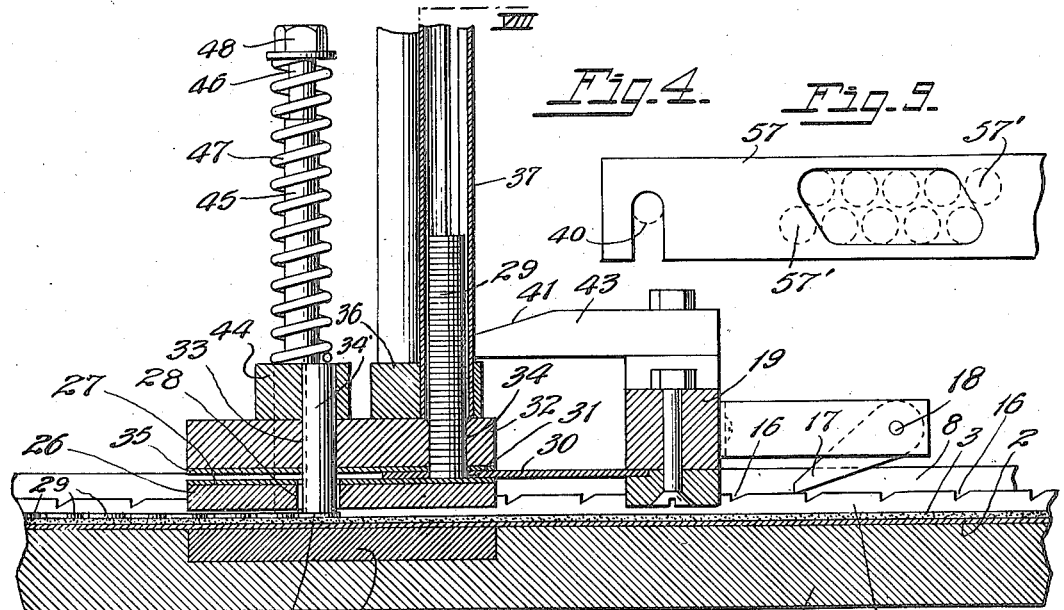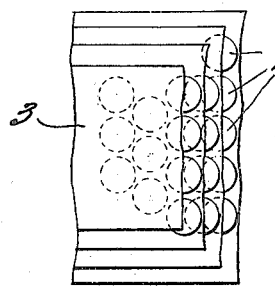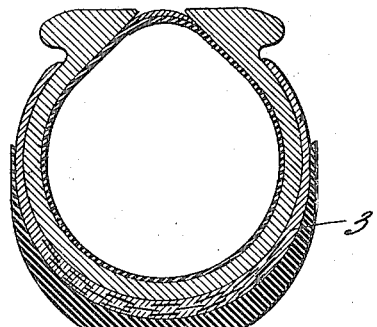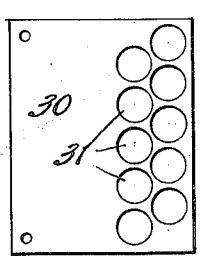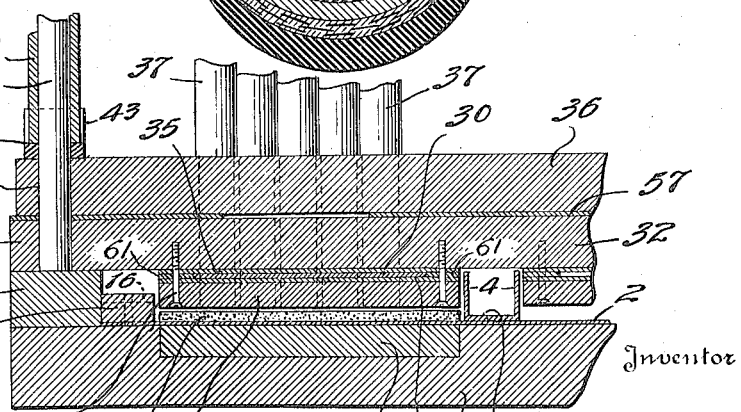

W. O. GOTTWALS.
TIRE MACHINE.
APPLICATION FILED MAR. 20, 1916.
1,248,645.
Patented Dec. 4, 1917.
4 SHEETS—SHEET 4.
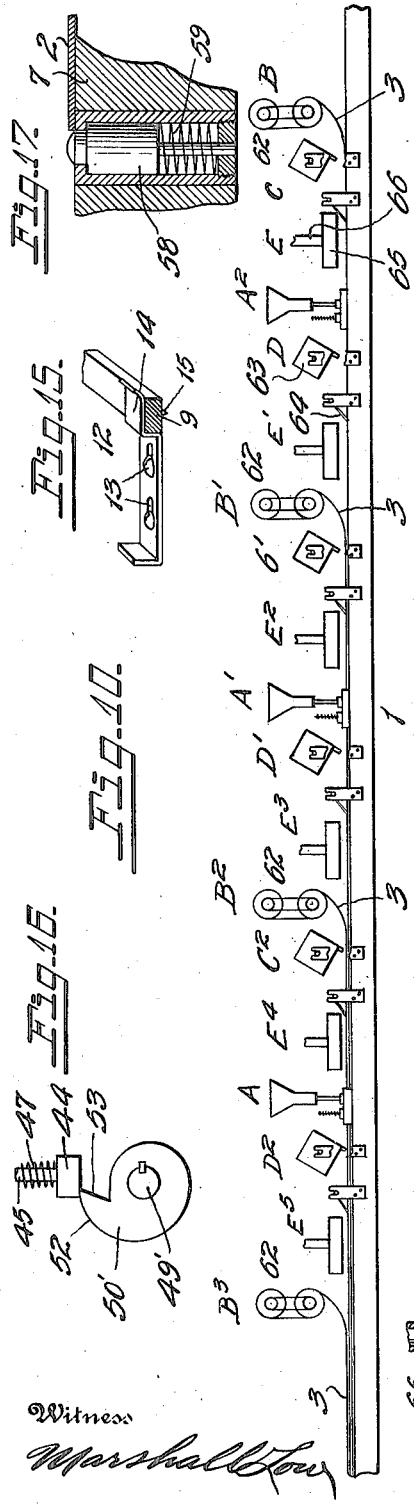
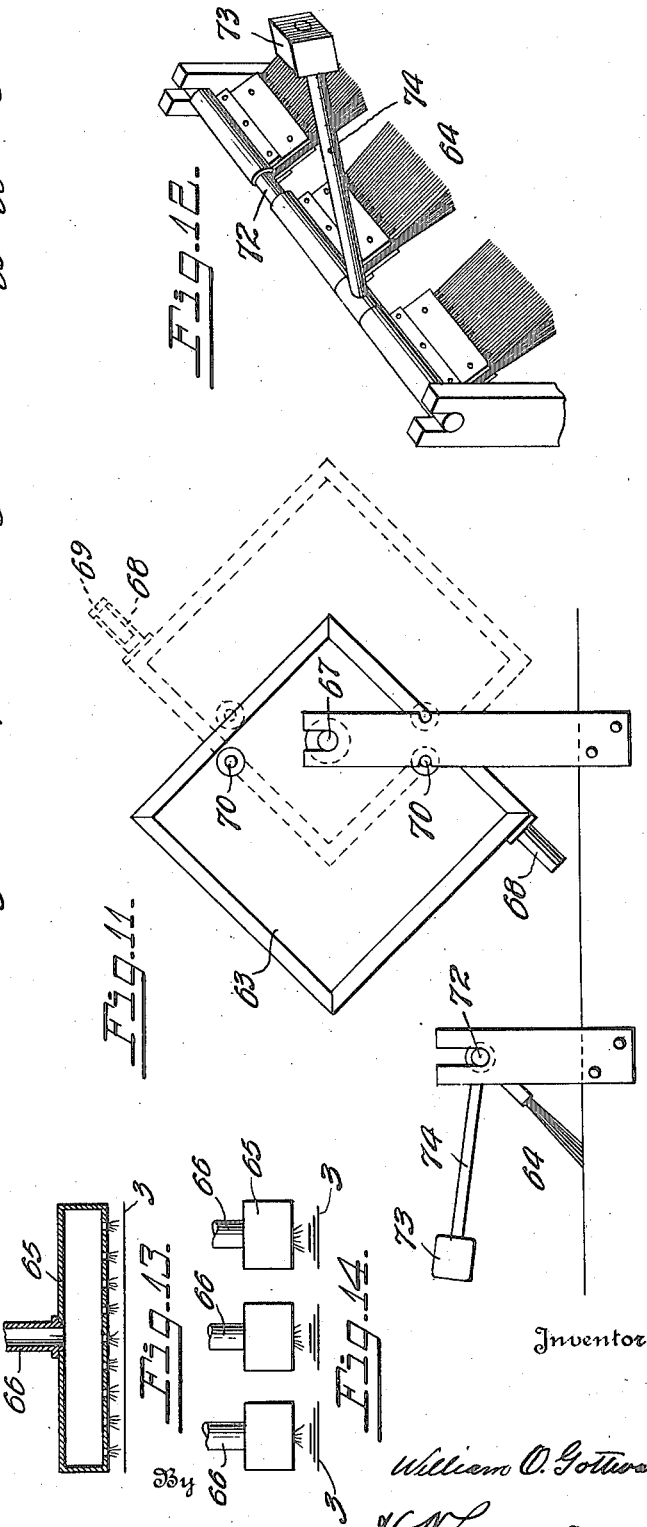
Witness
Marshall Low
Inventor
William O. Gottwals
By H. N. Low  Attorney

UNITED STATES PATENT OFFICE.

WILLIAM O. GOTTWALS, OF WASHINGTON, DISTRICT OF COLUMBIA.

TIRE-MACHINE.

1,248,645.  Specification of Letters Patent.  Patented Dec. 4, 1917.

Application filed March 20, 1916. Serial No. 85,396.

*To all whom it may concern:*

Be it known that I, WILLIAM O. GOTTWALS, a citizen of the United States, residing at Washington, District of Columbia, have invented certain new and useful Improvements in Tire-Machines, of which the following is a specification.

The invention relates to the art of making what is known as puncture proof tires, and more particularly to machinery for applying metal armor plates or disks to the surfaces of one or more layers of the rubber or other material of which the covering, sheath or outside tire is composed; and the invention has for its principal objects to greatly improve the rapidity of such construction, and consequent saving in time and labor, while maintaining the accuracy of the application of such metal plates or disks so that the chance of puncturing the tire is reduced to the minimum.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:

Fig. 2 is a side view of a portion of the machine.

Fig. 3 is a plan view of the same.

Fig. 4 is a vertical sectional view on line IV—IV of Fig. 3.

Fig. 5 is a plan view of the plate through which the disks are fed to the tire material.

Fig. 6 is a plan view of a portion of a tire, the same comprising four layers of material and three layers of metal disks, before the said material is shaped up into the tube-like form.

Fig. 7 is a transverse section of the tire.

Fig. 8 is a vertical transverse section on line VIII—VIII of Fig. 4.

Fig. 9 is a plan view of a portion of the disk-stop plate.

Fig. 10 is a side view showing diagrammatically the various parts of a complete machine organized according to my improvements.

Fig. 11 is a side view showing the cement-applying and spreading means.

Fig. 12 is a perspective view of the cement-spreading brushes.

Fig. 13 is a vertical longitudinal section through one of the cement-drying air trunks.

Fig. 14 is an end view showing three of said trunks arranged for drying three tire fabrics.

Fig. 15 is a perspective view illustrating the fabric-clamping means of the carriage.

Fig. 16 is a side view of a modification of the mechanism for actuating the disk-affixing devices.

Fig. 17 is a vertical section on a longitudinal plane illustrating the friction stop for the carriage.

Figure 1:
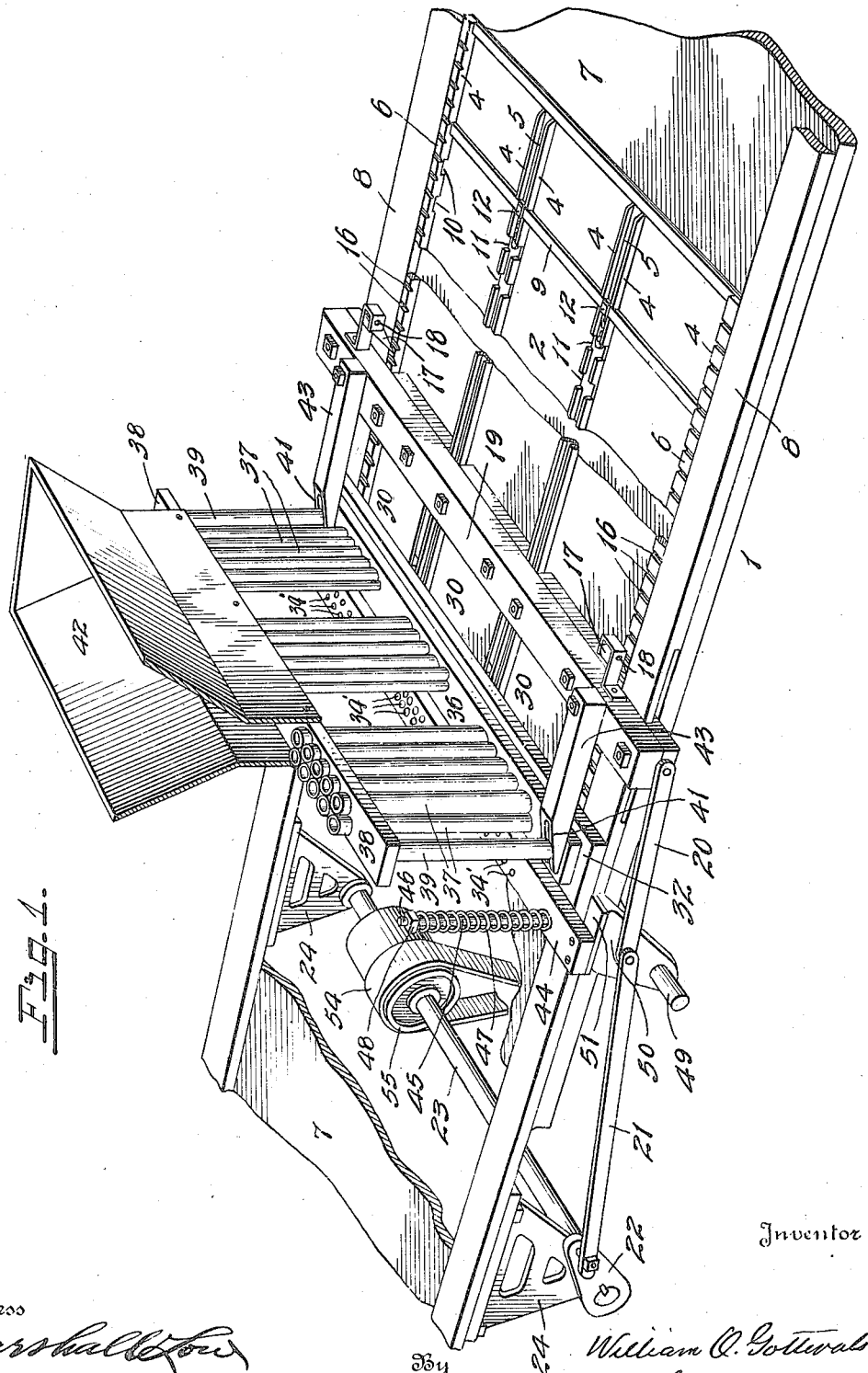
Figure 1 is a perspective view, partly broken away, of that part of the machine which is more particularly concerned with the feeding and placing of the metal plates or disks, the same embodying the invention.

Referring to the drawings, 1 is a table or frame of convenient height on which the operating instrumentalities are mounted. 2 is a plate supported on said frame on which one or more tire fabrics 3 may be carried into positions to have the puncture-proof plates applied. Preferably the plate 2 is adapted for supporting several of such fabrics at the same time, and is provided with longitudinally arranged limiting means, walls or flanges 4 between which said fabrics are held in proper alinement with the plate applying devices. The said limiting means keep the flexible fabrics and the edges thereof in alinement and may be in the form of vertical metal plates having horizontal bottom flanges 5 which are riveted to the plate 2. While the tire fabrics may be drawn over the plate 2 with a feeding motion it is preferred to attach the fabrics to the plate and give said plate a longitudinal feeding movement of suitable character, according to the operation of the plate-applying devices; and the plate 2 is constructed in the form of a carriage having side bars 6 to which said plate is riveted, so that the carriage may slide longitudinally of the frame on a table-member 7 of the frame 1 and between fixed side guides 8 thereof. In this construction the bars 6 form limiting walls for alining the outer edges of the two outer tire fabrics. The fabrics may be attached on the carriage by any suitable means. For this purpose I employ transverse clamping strips 9 of metal the ends of which are inserted in openings 10 in the bars 6 and the intermediate parts of which are received in spaces 11 of the flanges 4. Spring clamps 12 having a pin-and-slot connection 13 with the carriage are adapted to be slid over the strips 9 so that the latter are pressed tightly down by the lips 14 of the clamps. The strips are formed with points or prongs 15 on their under sides which pierce or indent the fabrics 3 sufficiently to hold them from being pulled from under the strips 9. I prefer to employ said or other clamping means at both the front and rear ends of each tire fabric.

In the construction shown the carriage is given an intermittent longitudinal feeding movement, carrying with it the fabric or fabrics to be armored, but the invention is not confined to such particular movement of the carriage. For said purpose the carriage has notches 16, preferably in the form of racks on the bars 6, with which engage pawls 17 which are pivotally mounted at 18 on a longitudinally reciprocable cross bar 19. The cross bar is mounted on the frame guides 8 and is longitudinally reciprocated by links 20 and pitman 21, the latter being operated by eccentrics or cranks 22 on a cross power-shaft 23. This shaft is mounted in suitable bearings on brackets 24 attached to the frame 1.

*The plate, disk or armor applying devices.*—25 is a metal bottom plate or anvil on the table 7, over which the carriage is adapted to move. 26 is a guide for the armor plates or disks, arranged over the anvil and over the path of the carriage, being suitably supported from the frame 1 by means of the plate 32 (Fig. 8). The guide 26 is of metal, having attached to its top surface a removable and replaceable wearing plate 27 of hard steel. The guide and wearing plate are formed with vertical through perforations 28, arranged in two transverse rows, the perforations of one row being alternated or staggered relative to the perforations of the other row so that the armor plates shall be applied in the corresponding desired manner. The number of perforations in each row is suitable to the diameter of the disks and the width of the fabric, or to the width of armored tread which it is desired to have on each layer or lamination, which is being armored, of the tire fabric. The horizontal shape of each perforation is according to the shape of the armor plates, whether they be circular (as shown) or of other shapes. The guide 26 serves to bring armor disks 29, when fed into the perforations 28, into the desired locations on the top adhesive face of the tire fabric as the latter is carried under the guide, whether by a continuous or intermittent motion. If the motion be continuous (as it will be if the carriage have gear racks operated by pinions on a cross rotary shaft, the latter being turned by a power pulley, or by a chain from the shaft 23) the disks are at once affixed to or impressed in the adhesive surface of the soft and yielding tire fabric by a sudden blow or pressure, being held momentarily in place by the walls of the perforations 28 until the blow is struck, and are carried onward with the fabric from under the guide 26. If the motion be intermittent, as illustrated, the disks are affixed at a period of rest of the fabric.

Over the guide 26 is arranged a feed plate 30 (Fig. 5) which has perforations 31 to correspond with the perforations 28, and is of substantially the same thickness as the armor disks. The front edge of the feed plate is attached to the reciprocating bar 19 (Fig. 4), so that disks in the perforations 31 will be delivered properly positioned on the fabric through the perforations 28, when the fabric has been fed for a distance equal substantially to the width of the said two rows of perforations, the result being to armor the fabric from end to end with evenly spaced disks having an alternated or staggered arrangement. The invention does not exclude applying the disks in rows extending across the fabric on diagonal lines, instead of on the right angle lines illustrated. Also it is to be understood that more than two rows of disks may be applied at one stroke or pressure, the feed of the tire fabric being correspondingly accelerated or made longer. It is important to obtain the proper alternation of the disks at one stroke, by applying at least two rows at once the disks of which will be exactly spaced apart and exactly alternated by the disk-holding perforations 28 and correspondingly arranged perforations in the disk-supplying and feeding means. A repetition of the applying stroke will give four rows of disks, all correctly located. If more than two rows of perforations and simultaneously applied disks are provided for, the rows should be of an even number, such as four, six, etc.

32 is a guide plate fixed on the frame 1 in line above the guide 26, and formed with two sets of perforations, each set having the same arrangement as the perforations shown in Fig. 5. The rear perforations 33 are in line above the perforations 28 and serve to guide the drivers or pressers 34' by which the disks are affixed to the fabric. The front perforations 34 are in line above the perforations 31 when the feed plate is in its forward position. The under side of the guide 32 has attached thereto a wearing plate 35 of hard steel, which may be replaced without renewal of the guide, and which is perforated correspondingly with the perforations 33 and 34. Above the perforations 34 is arranged a transverse plate or bar 36 the ends of which are mounted on the frame 1, and has fixed therein vertical disk-guides 37 which may be in the form of vertically slotted tubes. Each perforation 34 has above and communicating with it, and arranged to deliver armor disks into it, one of said guides or tubes 37. The upper ends of said tubes fit closely in perforations in a horizontal cross-plate 38 which has a vertically sliding fit on said tubes, and is carried by sleeves 39 fitting slidably on vertical rods 40 fixed on the bar 32. The sleeves 39 and plate 38 are reciprocated vertically by any suitable mechanism for the purpose of promoting the feed of the disks into and down through the tubes. I have shown for this purpose horizontally reciprocating arms 43 attached to the cross bar 19 and having cam faces 41 which engage under the bottom ends of the sleeves 39, so that the action of the cams 41 raises the sleeves 39 and the plate 38, the whole constituting a feeding device for feeding the armor disks into the tubes and downward. This feeding device descends by gravity, aided if desired by springs (not shown).

In the construction shown the plate 38 is utilized as the bottom of a vertically movable hopper 42 which receives the armor disks in loose condition in a mass, over the open ends of the tubes 37, so that the upward and downward movement of the plate 38 repeatedly lifts and lowers the mass of disks relative to the tubes and promotes the entrance of the disks into the tubes, in which they arrange themselves in stacks.

The pressers or drivers 34 are fixed in a vertically reciprocable bar 44 which has fixed thereon guide sleeves 45, the latter embracing guide rods 46 fixed on the ends of the plate 32. The bar 44 is depressed with more or less speed, so as to give a blow or a pressure by the elements 34' according to the nature of the bar-elevating mechanism, by springs 47 which bear upward against nuts 48 fixed on the rods 46 and downward against the movable bar 44.

Suitable mechanism is provided to elevate the disk-applying means 34 and allow it to descend as the tire fabric advances for each space of two rows of disks, and when the disks for two rows have been fed into the perforations 28. This mechanism may be of the nature illustrated, comprising a transverse shaft 49 mounted on the under side of the frame 1 and having fixed thereon a cam 50 at each side of the machine arranged to engage under and elevate the bar 44, or suitable plates 51 attached thereto. In Fig. 1 the shaft 49 is a rock shaft, the cams 50 being engaged by or fixed to the pivots which connect the links 20 and pitmen 21.

In such case the parts 34 will be let down at substantially the same speed as they are elevated and will act as pressers on the armor disks to apply them. In Fig. 16 the shaft 49' is rotary and the cams 50' have surfaces 52 to elevate the bar 44 and a radial or vertical shoulder 53 which allows the bar and drivers 34 to spring down with the velocity of a driving stroke in applying the armor disks. Power is or may be imparted to the described mechanism by a belt 54 on a pulley 55 fixed on the shaft 23. The invention is not limited to the exact construction, arrangement and connections of the power and actuating elements which feed the tire fabric and feed and apply the armor disks, as the same can be varied considerably and still give practical and useful results.

In the operation of the above described machine a length of tire fabric, suitable in length for the circumference of the tire covering to be produced, is cut off from a reel of the same, in which form the said fabric is ordinarily supplied; the fabric being preferably a woven band saturated and coated with a body of rubber. The said length of fabric, or, in the machine illustrated, three of such lengths, are secured on the carriage by the clamps 9 at their front and rear ends. To adapt the machine to clamp and operate on different lengths of tire-fabric, for different sized tires, the front part of the carriage is provided with a series of openings, 10 and spaces 11 for the clamps 9. It will be understood that before the fabric lengths are operated on they are coated on their top surfaces which are to receive the armor disks with a suitable cement or adhesive, such as rubber dissolved in benzin, which is allowed to become partly dry and tacky before the disk-applying operation begins. This coating is usually applied before the tire fabric lengths are clamped on the carriage. The carriage is then passed through the machine and said fabrics will receive transverse rows of armor disks as already described. The disks are preferably not applied for the full width of the fabric, flexible longitudinal margins being left, and the number of disks and length of the rows depends upon the size, strength and grade of tire to be produced. After the fabric has been armored from the rear clamp 9 to the front clamp, another coating of said cement is applied to the top of the fabric and disks thereon and allowed to partly dry, and on this coating another strip of fabric is applied. The clamps 9 need not be disturbed. This second layer of fabric is preferably narrower than the first layer, and is coated with said cement to receive a second layer of armor disks which are arranged over the spaces between the disks of the first layer so as to break joints therewith. The rows of this second layer ordinarily contain one less disk, and the machine is readjusted to feed and apply such less number, or by preference the fabric of two layers is put through a second set of disk feeding and applying devices in which the guide 26 is higher above the plate 2 to accommodate two thicknesses of fabric. The above described procedure is repeated to produce a fabric of three layers with three layers of disks, the top layer of the latter having say only three disks in a row applied by a third correspondingly adjusted set of disk feeding and applying devices. Over these latter disks is applied the last and narrowest layer of fabric. After such a tire shield is completed it is cut across at the ends along the inner sides of the clamps 9 and released from the carriage, a portion of such shield being shown in Fig. 6. The shield is then molded and vulcanized with other parts into an armored tire casing, shown in section in Fig. 7.

The invention thus far described constitutes an operative and practical means to be used in the manufacture of armored tires, the adhesive or cement having been applied by hand or otherwise. But it is preferred to combine a plurality—say three—of sets of disk feeding and applying mechanisms, with automatic cement applying devices, so as to organize a complete machine of great capacity, which is labor saving and economical in manufacture to a high degree.

The perforations 31 of the feed plate are or may be sufficient in number for the maximum number of disks that will be required in a row for the widest tires to be manufactured. For readjusting the disk feeding means it is preferred not to remove or disturb the plate 30, but when a smaller number of disks is to be fed the bar 36 is lifted slightly, it being movable vertically and held in place by the rods 40 located in perforations 56 in the bar 36. Then a stop plate 57 (Fig. 9) is inserted between the bar 36 and the plate 32, the said plate being formed to cut off by parts 57', the feed of disks from the two extreme end tubes 37 but to allow the feed of disks through all of the other intermediate tubes. The stop plate is formed at its ends with slots which embrace the guide rods 40 and properly locate the stop plate for said purpose. It will be understood that several such stop plates are or may be provided and employed each shaped to cut off the feed from more or less of the end tubes 37, and in the said figure the dotted lines indicate the interior shape of such a stop plate as will allow the feed of only six disks at a stroke. Any disks which may be in the perforations of the plate 32 below the intercepting portions of the stop plate, after the latter is applied, may work out by a few operations of the machine before the operation of applying disks to the tire fabric begins.

The required feed of the fabric being say one inch and that of the disk feed plate 30 about an inch and three-quarters, the pawls 17 move forward of the notches 16, which they are about to engage, about three quarters of an inch and do not begin to move the carriage till they have moved rearward said distance. The carriage is arrested temporarily by a friction stop when the rear end of the fabric is nearly in position for the application of disks to it to begin. A carriage having tire fabrics clamped on it may be put in the machine and moved rearward by hand till said stop is encountered, and then the pawls 17 may be thrown by hand into working position and the action of said pawls will overcome the resistance of said stop and feed the carriage rearward. Such a stop may be in the form of one or more vertically movable pins 58 having rounded upper ends and mounted in the table 7 at a proper point to engage the rear edge of the carriage plate 2 by their upwardly projecting ends (Fig. 17). Said pins are supported so as to be downwardly yielding by springs 59. After the carriage has passed above said pins they act to control the carriage by friction so that they will stop it at the end of the rearward pawl-stroke and not allow the pawls to overthrow the carriage. When disks have been applied to the front end of the tire-fabric the pawls 17 are thrown out by hand, and the machine is stopped if desired, and the carriage is moved by hand a little farther rearward to carry its front end clear of the disk applying mechanism. The guide plate 26 is secured to the under-side of the plate 32 by screws 60 (Fig. 8), liners 61 being interposed between the wearing plates 27 and 35 to make a space for the play of the feed plate 30. The said wearing plates are important, because it is necessary that the parts 26 and 32 have surfaces which will remain accurate under considerable wear, and it is difficult to temper said parts to sufficient hardness after boring, as the partitions between the perforations are made as thin as possible and are likely to crack if tempered. The above description of a single set of armor disk feeding and affixing means applies to the several sets thereof which are or may be arranged in line across the machine (Fig. 1), and also to such means when arranged in succession along a table or frame to affix superposed layers of disks.

Referring more particularly to a machine of the latter character (Fig. 10), the frame 1 is made of considerable length and a carriage, or succession of carriages, is caused to move along said frame from the front to the rear end thereof, so as to pass several disk applying stations A, A', A², there being three of such stations provided in the machine illustrated adapted to apply three layers of disks in the manner already described. The number of such stations is varied according to the number of such layers desired in the tire fabrics. As already pointed out any convenient number of sets of disk applying devices may be arranged across the machine at each of said stations. At the station B tire fabrics are attached on the carriages before they advance to the station A, and at stations B', B² and B³ tire fabrics, preferably progressively narrower, are applied on disks previously affixed. At these stations fabric is conveniently drawn and cut off from reels 62 supported above the machine. At said stations C, C' and C² cement is automatically applied from reservoirs 63, and spread by brushes or equivalent means 64, on the fabrics before the armor disks are affixed. At stations D, D' and D² cement is applied in a similar manner over the previously affixed disks for the adhesion of the next above layer of fabric. At stations E, E', E², E³, E⁴ and E⁵ the just applied cement is partly dried by the evaporation of its solvent by hot or other air delivered from longitudinal air trunks 65, one such trunk being supported from the frame 1, or from above, just over and parallel with each strip of tire fabric, and having an air delivery slot or series of holes directed downward so that the air will blow strongly on the applied cement, air being supplied to the trunks by pipes 66 leading from a suitable air-forcing means (not shown). The cement applying and spreading devices may be supported from the side or sides of the frame 1.

The cement reservoirs 63 are preferably mounted to be turned on transverse axes 67, each reservoir being provided with cement delivering spouts 68 closable by plugs 69. These spouts are arranged in series of, say, seven spouts each, such a series being located over the path of each tire-fabric (Fig. 11). The reservoirs 63 may be turned on their axes 67 to elevate the spouts 68 into inoperative position or to depress them into delivering position, being held in either position by stops 70, the axes 67 being sufficiently eccentric to cause such action of the stops. Or any suitable holding means may be employed for this purpose. The plugs 69 are removed from those spouts which are desired to operate, according to the width of the fabric. The cement spreading brushes 64 are preferably pivoted on transverse axes 72 (Fig. 12) and are held to the fabric with the desired pressure by weights 73 adjustable on arms 74.

What is claimed is:—

1. In a tire machine, in combination: a supporting frame having a longitudinal guide for a tire fabric, on which guide said fabric may be moved to bring successive parts thereof into place for the application of puncture-proof plates thereto; guides for supporting stacks of said plates; plate-applying devices mounted near said stack-guides; means for withdrawing a series of said plates from the said stacks and arranging them relative to the tire fabric and to the plate-applying devices; and means for actuating said plate-applying devices.

2. In a tire machine, in combination: a supporting frame having a longitudinal guide; a tire-fabric carriage movable thereon; means for giving an intermittent movement to the carriage to bring successive parts of a tire fabric into place for the application of puncture-proof plates thereto; guides for supporting stacks of said plates; plate-applying devices mounted near said stack-guides; means for withdrawing a series of said plates from the said stacks and arranging them relative to the tire fabric and to the plate-applying devices; and means for actuating said plate-applying devices.

3. In a tire machine, in combination: a supporting frame having a longitudinal guide; a tire-fabric carriage movable thereon having a plurality of parallel spaces for receiving tire-fabrics; means for securing said fabrics side by side on the carriage; means for giving an intermittent movement to the carriage to bring successive parts of a tire fabric into place for the application of puncture-proof plates thereto; guides for supporting stacks of said plates; plate-applying devices mounted near said stack guides; means for withdrawing a series of said plates from the said stacks and arranging them relative to the tire fabric and to the plate-applying devices; and means for actuating said plate-applying devices.

4. In a tire machine, in combination: a supporting frame having a longitudinal guide; a tire-fabric carriage movable thereon having means for engaging the side edges of a plurality of tire-fabrics; means for giving an intermittent movement to the carriage to bring successive parts of a tire fabric into place for the application of puncture-proof plates thereto; guides for supporting stacks of said plates; plate-applying devices mounted near said stack guides; means for withdrawing a series of said plates from the said stacks and arranging them relative to the tire fabric and to the plate-applying devices; and means for actuating said plate-applying devices.

5. In a tire machine, in combination: a supporting frame having a longitudinal guide for a tire fabric, on which guide said fabric may be moved to bring successive parts thereof into place for the application of puncture-proof plates thereto; guides for supporting stacks of said plates; plate-applying devices mounted near said stack-guides and operating on the lowermost plates irrespective of the stacks for applying said plates to the fabric; and means for actuating said plate-applying devices.

6. In a tire machine, in combination; a supporting frame having a longitudinal guide for a tire fabric, on which guide said fabric may be moved to bring successive parts thereof into place for the application of puncture-proof plates thereto; two rows of alternating guides for supporting stacks of said plates; plate-applying devices mounted near said stack-guides; a movable plate having two rows of alternating plate-engaging means for withdrawing series of said plates from the said stacks and arranging them relative to the tire fabric and to the plate-applying devices; and means for actuating said plate-applying devices.

7. In a tire machine, in combination: a supporting frame having a longitudinal guide for a tire fabric, on which guide said fabric may be moved to bring successive parts thereof into place for the application of puncture-proof plates thereto; guides for supporting stacks of said plates; plate-applying impact devices mounted near said stack-guides; means for withdrawing a series of said plates from the said stacks and arranging them relative to the tire fabric and to the plate-applying devices; and means for actuating said plate-applying devices.

8. In a tire machine, in combination: means for feeding a tire fabric; devices for supplying armor disks; means for applying said disks to the fabric; a disk carrying plate formed with two rows of alternated perforations for receiving such disks from the supplying devices and depositing them between the fabric and the said applying means; and mechanism for actuating said carrying plate; the fabric feeding means acting to move the fabric for a distance equal to the width of said two rows of perforations at each actuation of said carrying plate.

9. In a tire machine, in combination: a carriage for feeding a tire fabric having thereon clamps for removably securing the ends of the fabric; armor disk feeding means; and disk applying devices independent of said disk feeding means for applying said disks to the tire fabric as it is advanced by said carriage.

10. In a tire machine, in combination: a supporting frame having means for intermittently advancing an adhesive tire fabric; means for feeding puncture-proof plates into alternating positions to be applied to the said adhesive fabric; and impact devices for applying the said plates to the fabric in rows, the plates of one row alternating with the plates of the next row.

11. In a tire machine, in combination: a supporting frame having a longitudinal guide; a tire-fabric carriage movable thereon; means for giving movement to the carriage to bring successive parts of a tire fabric into place for the application of puncture-proof plates thereto; cement applying means for coating the tire-fabric as it is moved; guide for supporting stacks of said plates; plate-applying devices mounted near said stack guides; means for withdrawing a series of said plates from the said stacks and arranging them relative to the tire fabric and to the plate-applying devices; and means for actuating said plate-applying devices.

12. In a tire machine, in combination: a supporting frame having a longitudinal guide; a tire-fabric carriage movable thereon; means for giving movement to the carriage to bring successive parts of a tire fabric into place for the application of puncture-proof plates thereto; cement applying means for coating the tire-fabric as it is moved; cement drying means; guides for supporting stacks of said plates; plate-applying devices mounted near said stack guides; means for withdrawing a series of said plates from the said stacks and arranging them relative to the tire fabric and to the plate-applying devices; and means for actuating said plate-applying devices.

13. In a tire machine, in combination: a supporting frame having means for intermittently advancing a tire fabric; means for applying adhesive to the said fabric; means for feeding puncture-proof plates into alternating positions to be applied to the said adhesive fabric; and devices for applying the said plates to the fabric in rows, the plates of one row alternating with the plates of the next row.

14. In a tire machine, in combination: a supporting frame having means for intermittently advancing a tire fabric; means for applying adhesive to the said fabric; means for feeding puncture-proof plates into positions to be applied to the said adhesive fabric; and impact devices for applying the said plates to the fabric.

15. In a tire machine, in combination: a supporting frame having means for advancing a tire fabric; means for applying adhesive to the said fabric; means for feeding puncture-proof plates into alternating positions to be applied to the said adhesive fabric; and impact devices for applying the said plates to the fabric in rows, the plates of one row alternating with the plates of the next row.

16. In a tire machine, in combination: a supporting frame having means for intermittently advancing a tire fabric; means for applying adhesive to the said fabric; means for feeding puncture-proof plates into alternating positions to be applied to the said adhesive fabric; and impact devices for applying the said plates to the fabric in rows, the plates of one row alternating with the plates of the next row.

17. In a tire machine, in combination: armor-disk applying devices arranged to apply such disks in rows on a tire fabric; guiding means for such fabric when fed to said applying devices; means for feeding armor disks to said applying devices; and a stop plate for cutting off the feed of disks to the ends of said rows, said plate being removable to allow the feeding of the entire row of disks.

18. In a tire machine, in combination: means for holding superposed armor disks in rows at a feeding station; means for feeding said disks successively to a disk applying station; a row of disk applying means at said applying station; and means for feeding a fabric to be armored past said disk applying station.

In testimony whereof I affix my signature hereto.

WILLIAM O. GOTTWALS.

Witness:
J. E. GILES.